United States Patent
Mizuguchi et al.

(10) Patent No.: US 11,085,443 B2
(45) Date of Patent: Aug. 10, 2021

(54) COMPRESSOR INCLUDING TERMINAL PROTECTION STRUCTURE

(71) Applicant: Daikin Industries, LTD., Osaka (JP)

(72) Inventors: Tomoko Mizuguchi, Osaka (JP); Souichi Nakamura, Osaka (JP); Toru Sugiyama, Osaka (JP); Yoshihiro Shinohara, Osaka (JP); Kouji Kojima, Osaka (JP); Satomi Kinoshita, Osaka (JP); Kazuyuki Hara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/491,016

(22) PCT Filed: Apr. 18, 2018

(86) PCT No.: PCT/JP2018/016044
§ 371 (c)(1),
(2) Date: Sep. 4, 2019

(87) PCT Pub. No.: WO2018/194106
PCT Pub. Date: Oct. 25, 2018

(65) Prior Publication Data
US 2020/0032792 A1   Jan. 30, 2020

(30) Foreign Application Priority Data
Apr. 19, 2017 (JP) .............................. JP2017-082517

(51) Int. Cl.
*F04C 14/28* (2006.01)
*F25B 31/02* (2006.01)
(Continued)

(52) U.S. Cl.
CPC ............ *F04C 14/28* (2013.01); *F25B 31/026* (2013.01); *F25B 49/02* (2013.01); *H02K 5/225* (2013.01);
(Continued)

(58) Field of Classification Search
CPC .... H02K 5/225; H02K 5/22; H02K 2400/077; F04B 39/121; H01R 13/44; H01R 13/5205; F04C 14/28; F04C 2240/803
See application file for complete search history.

(56) References Cited

U.S. PATENT DOCUMENTS

2009/0233498 A1   9/2009   Nakajima
2015/0295363 A1*  10/2015  Wang ............... H01R 13/65912
                                                           439/578

FOREIGN PATENT DOCUMENTS

EP   0 881 393 A1   2/1998
JP   51-126408 U   10/1976
(Continued)

OTHER PUBLICATIONS

European Search Report of corresponding EP Application No. 18 78 7893.9 dated Jan. 3, 2020.
(Continued)

*Primary Examiner* — Abdullah A Riyami
*Assistant Examiner* — Justin M Kratt
(74) *Attorney, Agent, or Firm* — Global IP Counselors, LLP

(57) ABSTRACT

A compressor (10) includes a casing (20), a terminal (29) protruding from the casing, a first cover (70) covering the terminal, and a second cover (50) covering the first cover.

24 Claims, 6 Drawing Sheets

(51) Int. Cl.
*F25B 49/02* (2006.01)
*H02K 5/22* (2006.01)
*H01R 13/44* (2006.01)
*H01R 13/52* (2006.01)
*F04B 39/00* (2006.01)
*F04B 39/12* (2006.01)
*F04B 35/04* (2006.01)

(52) U.S. Cl.
CPC ............... *F04B 35/04* (2013.01); *F04B 39/00* (2013.01); *F04B 39/121* (2013.01); *F04C 2240/803* (2013.01); *F25B 2400/077* (2013.01); *H01R 13/44* (2013.01); *H01R 13/5205* (2013.01); *H02K 5/22* (2013.01)

(56) References Cited

FOREIGN PATENT DOCUMENTS

| JP | 61-10060 U | | 1/1986 |
|---|---|---|---|
| JP | 1-144477 U | | 10/1989 |
| JP | 4-166684 A | | 6/1992 |
| JP | 5-99144 A | | 4/1993 |
| JP | 2599027 B2 | * | 4/1997 |
| JP | 9-158838 A | | 6/1997 |
| JP | 2001-20861 A | | 1/2001 |
| JP | 2004-245152 A | | 9/2004 |
| JP | 2007-146728 A | | 6/2007 |
| JP | 2009-281270 A | | 12/2009 |
| JP | 2009281270 A | * | 12/2009 |
| JP | 2010-24940 A | | 2/2010 |

OTHER PUBLICATIONS

International Preliminary Report of corresponding PCT Application No. PCT/JP2018/016044 dated Oct. 31, 2019.
International Search Report of corresponding PCT Application No. PCT/JP2018/016044 dated Jul. 17, 2018.

* cited by examiner

COMPRESSOR INCLUDING TERMINAL PROTECTION STRUCTURE

TECHNICAL FIELD

The present invention relates to a compressor including a terminal protection structure.

BACKGROUND ART

A compressor mounted in a refrigeration machine receives power to compress refrigerant. If an object or user contacts a terminal for energization, an electrical system may be short-circuited or the user may be injured. In order to prevent such an accident, the compressor is provided with a terminal protection structure that covers the terminal.

The terminal protection structure disclosed in Patent Literature 1 (JP 2007-146728 A) includes a metal terminal guard and a resin terminal cover engaged with the terminal guard, and covers a terminal.

SUMMARY OF THE INVENTION

Technical Problem

A terminal is fixed to a casing while passing through the casing. As long as a compressor is used normally, a durability problem usually does not occur as to a terminal fixing portion. However, if the compressor is operated for an unreasonably long period of time without caring the product lifetime of the compressor, refrigerant may blow off the terminal at the terminal fixing portion with reduced durability. In that case, the refrigerant leaking out of the casing may then blow off a terminal cover, which in turn may cause an accident that injures the user.

An object of the present invention is to suppress occurrence of such an accident in preparation for an unlikely event where the refrigerant leaks from the terminal fixing portion with reduced durability.

Solution to Problem

A compressor according to a first aspect of the present invention includes a casing, a terminal protruding from the casing, a first cover covering the terminal, and a second cover covering the first cover.

According to this configuration, the first cover is covered by the second cover. Therefore, even if the first cover is damaged and broken due to refrigerant leaking from a broken part of the terminal, scattered matters such as fragments of the terminal and the first cover are blocked by the second cover. This restrains occurrence of an accident such as injury of a user.

A compressor according to a second aspect of the present invention is the compressor according to the first aspect, wherein the first cover includes resin and the second cover includes metal.

According to this configuration, the first cover located close to the terminal includes resin. Therefore, the fragments of the first cover do not cause undesirable conduction between terminal pins. The second cover disposed on the outer side includes metal, and therefore can withstand the collision of scattered matters.

A compressor according to a third aspect of the present invention is the compressor according to the first or second aspect, wherein a differential volume obtained by subtracting a first volume, which is a volume of the first cover, from a second volume, which is a volume of the second cover, is larger than the first volume.

According to this configuration, the differential volume is larger than the first volume. This configuration is suitable for reducing the force of the refrigerant or scattered matters spouting from a broken part of the terminal.

A compressor according to a fourth aspect of the present invention is the compressor according to any one of the first to third aspects, wherein a flame-extinguishing member is provided on an inner surface of the second cover.

According to this configuration, the leaked refrigerant collides with the metal flame-extinguishing member. Therefore, the flame-extinguishing member restrains the ignition even if there is an ignition cause such as refrigerant, droplets of refrigeration oil, or an electric spark.

A compressor according to a fifth aspect of the present invention is the compressor according to any one of the first to fourth aspects, wherein the first cover includes a first opening side surface in which a first opening for passing a lead wire is formed. The second cover includes a second opening side surface in which a second opening for passing the lead wire is formed.

A compressor according to a sixth aspect of the present invention is the compressor according to the fifth aspect, wherein the second opening is provided with a seal material that restrains flow of air passing through the second opening.

According to this configuration, the second opening is provided with the seal material. This restrains oxygen supply to the inside of the second cover.

A compressor according to a seventh aspect of the present invention is the compressor according to the fifth or sixth aspect, wherein the first opening side surface and the second opening side surface do not face each other.

According to this configuration, the first opening side surface and the second opening side surface do not face each other. When ignition occurs at a broken part of the terminal, therefore, the flame is less likely to go out of the second cover.

A compressor according to an eighth aspect of the present invention is the compressor according to the seventh aspect, wherein the first opening side surface and the second opening side surface are not parallel to each other.

According to this configuration, the first opening side surface and the second opening side surface are not parallel to each other. Therefore, the flame ejected from a broken part of the terminal toward the first opening is less likely to go out of the second cover through the second opening.

A compressor according to a ninth aspect of the present invention is the compressor according to the fifth or sixth aspect, wherein the first opening side surface and the second opening side surface face each other.

According to this configuration, the first opening side surface and the second opening side surface face each other. This makes it easy to route the lead wire such that the lead wire passes through both the first opening and the second opening.

A compressor according to a tenth aspect of the present invention is the compressor according to any one of the fifth to ninth aspects, wherein the first opening has an area larger than an area of the second opening.

According to this configuration, the area of the second opening is small. Therefore, the flame is less likely to leak out of the second cover.

A compressor according to an eleventh aspect of the present invention is the compressor according to any one of the fifth to tenth aspects, wherein the first opening has a center separated from the casing by a first distance. The second opening has a center separated from the casing by a second distance. The first distance is different from the second distance.

According to this configuration, the distance between the first opening and the casing is different from the distance between the second opening and the casing. Therefore, the flame generated near the terminal is less likely to leak out of the second cover.

A compressor according to a twelfth aspect of the present invention is the compressor according to the eleventh aspect, wherein the first distance is larger than the second distance.

According to this configuration, the first distance is larger than the second distance. Therefore, the flame generated near the terminal is further less likely to leak out of the second cover.

A compressor according to a thirteenth aspect of the present invention is the compressor according to any one of the fifth to twelfth aspects, wherein the first opening side surface and a surface of the second cover facing the first opening side surface are separated by 20 mm or more.

According to this configuration, a space is generated between the first cover and the second cover. Therefore, the force of the flame can be weakened in that space.

A compressor according to a fourteenth aspect of the present invention is the compressor according to any one of the first to thirteenth aspects, wherein the casing is provided with a first cover support and a second cover support. The first cover is attachable to and detachable from the first cover support. The second cover is attachable to and detachable from the second cover support independently of the first cover.

According to this configuration, the first cover and the second cover are attached independently of each other. This structure suppresses scattering of the second cover caused by scattering of the first cover.

A compressor according to a fifteenth aspect of the present invention is the compressor according to the fourteenth aspect, wherein the second cover is fastened to the second cover support by a bolt.

According to this configuration, the second cover is fastened to the second cover support by a bolt. Therefore, the second cover is firmly fixed.

A compressor according to a sixteenth aspect of the present invention is the compressor according to the fourteenth or fifteenth aspect, wherein the first cover is fastened to the first cover support by a bolt.

According to this configuration, the first cover is fastened to the first cover support by a bolt. Therefore, the first cover is firmly fixed.

A compressor according to a seventeenth aspect of the present invention is the compressor according to any one of the first to thirteenth aspects, wherein the first cover is fixed to the second cover.

According to this configuration, the first cover is fixed to the second cover. This facilitates the attachment of the first cover and the second cover to the casing.

A compressor according to an eighteenth aspect of the present invention is the compressor according to the seventeenth aspect, wherein the first cover is a sheet attached to the second cover.

A compressor according to a nineteenth aspect of the present invention is the compressor according to the seventeenth aspect, wherein the first cover is a paint applied to the second cover.

A compressor according to a twentieth aspect of the present invention is the compressor according to any one of the seventeenth to nineteenth aspects, wherein the casing is provided with a cover support. Both the first cover and the second cover are fastened to the cover support by a common fastener.

According to this configuration, the first cover and the second cover are more easily attached to the casing.

A compressor according to a twenty-first aspect of the present invention is the compressor according to the twentieth aspect, wherein the second cover is configured to be independently fastened to the cover support by a fastener.

Advantageous Effects of Invention

According to the compressor of the present invention, the occurrence of an accident such as injury of a user is suppressed.

DESCRIPTION OF EMBODIMENTS

First Embodiment (1) Overall Configuration

Figure 1:
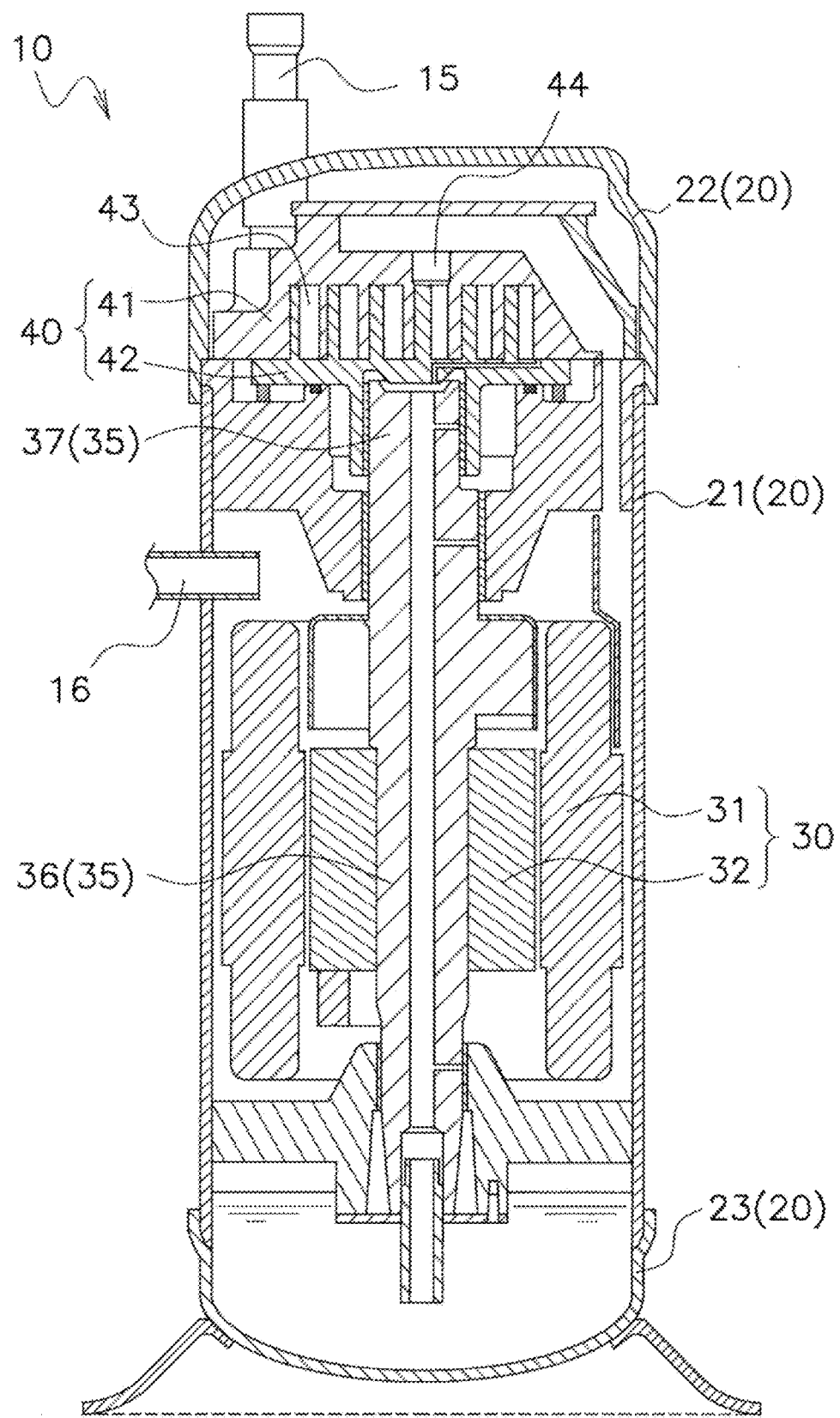
FIG. 1 is a cross-sectional view of a compressor 10 according to a first embodiment of the present invention.

FIG. 1 illustrates a compressor 10 according to a first embodiment of the present invention. The compressor 10 is mounted in a refrigeration machine such as an air conditioner in order to compress refrigerant which is a fluid. The compressor 10 is a scroll compressor. The compressor 10 includes a casing 20, a motor 30, a crankshaft 35, and a compression mechanism 40. The casing 20 includes a body portion 21, an upper portion 22, and a lower portion 23. The compression mechanism 40 includes a fixed scroll 41 and a movable scroll 42, and defines compression chambers 43.

Power supplied from the outside excites a coil installed in a stator 31 of the motor 30, whereby a rotor 32 rotates. The rotation of the rotor 32 is transmitted to a main shaft portion 36 of the crankshaft 35. The movable scroll 42 revolves with respect to the fixed scroll 41 by the power transmitted from an eccentric portion 37 of the crankshaft 35. Low-pressure gas refrigerant sucked through a suction pipe 15 enters the compression chamber 43 on the outer peripheral side of the compression mechanism 40. As the movable scroll 42 revolves, the compression chamber 43 moves toward the center of the compression mechanism 40 while reducing the volume of the compression chamber 43. During this process, the low-pressure gas refrigerant is compressed to turn into high-pressure gas refrigerant. The high-pressure gas refrigerant is discharged to the outside of the compression mechanism 40 through a discharge port 44, and moves to a space inside the casing. Then, the high-pressure gas refrigerant is discharged to the outside of the casing 20 through a discharge pipe 16.

(2) Detailed Configuration

Figure 2:
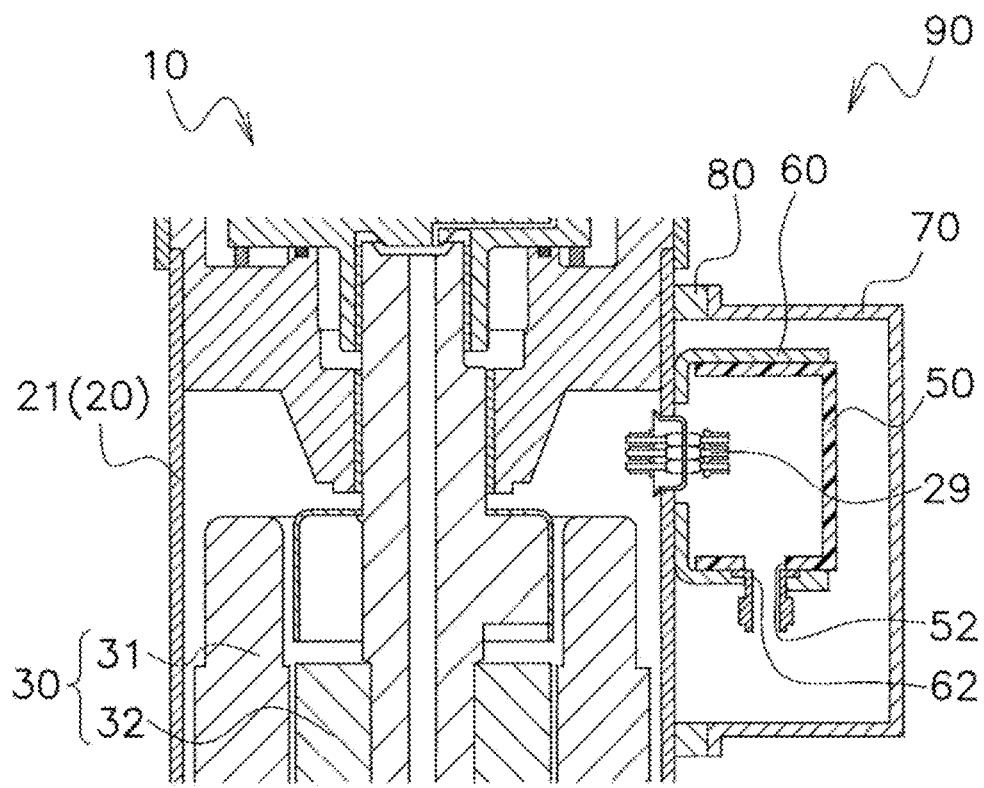
FIG. 2 is a cross-sectional view of a main part of the compressor 10.
Figure 3:
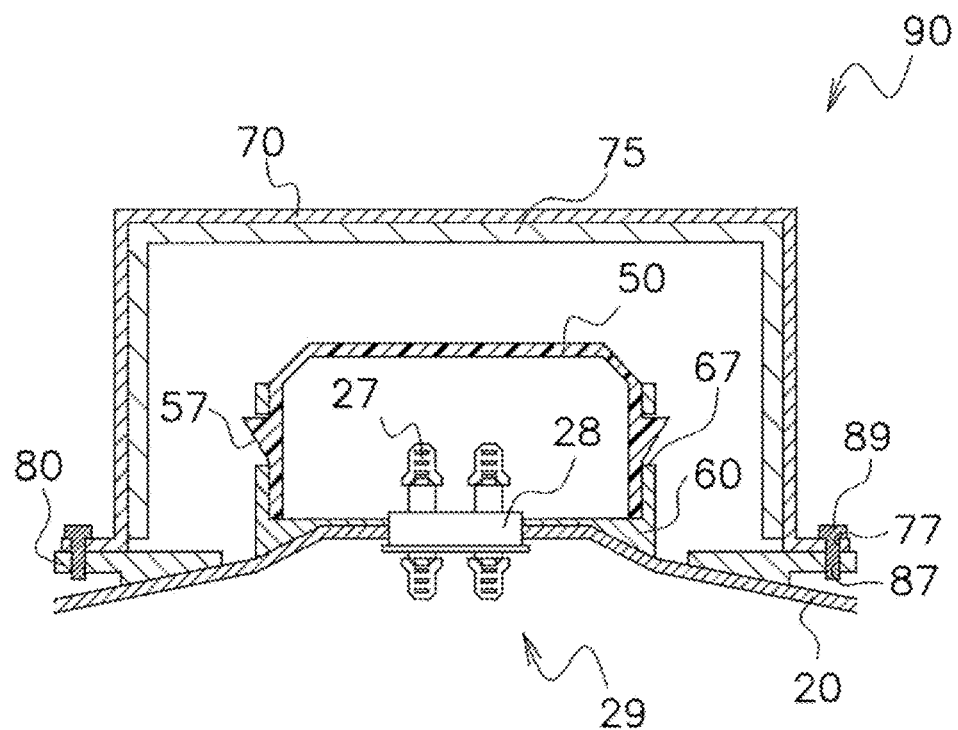
FIG. 3 is a cross-sectional view of a terminal protection structure 90.

FIG. 2 is a cross-sectional view of the compressor 10 taken along a cross section different from that of FIG. 1. The compressor 10 further includes a terminal 29 and a terminal protection structure 90 for preventing an object or user from contacting the terminal 29. FIG. 3 is a schematic cross-sectional view of the terminal protection structure 90 on a horizontal plane. The terminal protection structure 90 includes a first cover 50, a first cover support 60, a second cover 70, and a second cover support 80. Each element will be described in detail below.

(2-1) Terminal 29

The terminal 29 is for supplying power to the motor 30. As illustrated in FIG. 3, the terminal 29 includes terminal pins 27 and a terminal base 28 that supports the terminal pins 27. A lead wire (not illustrated) for power supply is connected to the terminal pins 27. The terminal 29 is installed while protruding from the casing 20.

(2-2) First Cover Support 60

The first cover support 60 is provided on the casing 20 while surrounding the terminal 29. The first cover support 60 is, for example, a metal member welded to the casing 20. As illustrated in FIG. 2, the first cover support 60 is provided with a first cover support opening 62 through which the lead wire passes.

(2-3) First Cover 50

The first cover 50 illustrated in FIG. 3 is a resin cover configured to cover the terminal 29. The first cover 50 is configured to fit on the inner side of the first cover support 60. The first cover 50 is attachable to and detachable from the first cover support 60. The first cover 50 includes claw portions 57. The first cover 50 is attached to the first cover support 60 by the claw portions 57 engaging with holes 67 provided at the first cover support 60. The volume of a space formed by the first cover 50 is a first volume C1. As illustrated in FIG. 2, the first cover 50 is provided with a first opening 52 through which the lead wire passes. With the first cover 50 attached to the first cover support 60, the first opening 52 overlaps the first cover support opening 62, thereby allowing the lead wire to pass therethrough.

(2-4) Second Cover Support 80

The second cover support 80 illustrated in FIG. 3 is a metal member welded to the casing 20. The second cover support 80 is provided with a screw hole 87 for a fastener 89 such as a bolt or a screw.

(2-5) Second Cover 70

The second cover 70 is a metal cover configured to cover the first cover 50. The second cover 70 is attachable to and detachable from the second cover support 80 independently of the first cover 50. The second cover 70 has through holes 77 through which the fasteners 89 pass. The second cover 70 is fastened to the second cover support 80 by the fasteners 89.

For example, a flame-extinguishing member 75 may be provided on the inner surface of the second cover 70. In an unlikely event where refrigeration oil or flammable refrigerant spouts from an opening such as a crack generated in the casing 20 due to removal of the terminal 29 and the spouted material ignites, the flame-extinguishing member 75 lowers the temperature of the spouted material and restrains the flame from spreading to the outside. Examples of the flame-extinguishing member 75 include a metal mesh, a metal honeycomb, and a metal porous plate.

The volume of a space formed by the second cover 70 is a second volume C2. A differential volume CD obtained by subtracting the first volume C1 from the second volume C2 is set to be larger than the first volume C1.

(3) Lead Wire Routing

Figure 4:
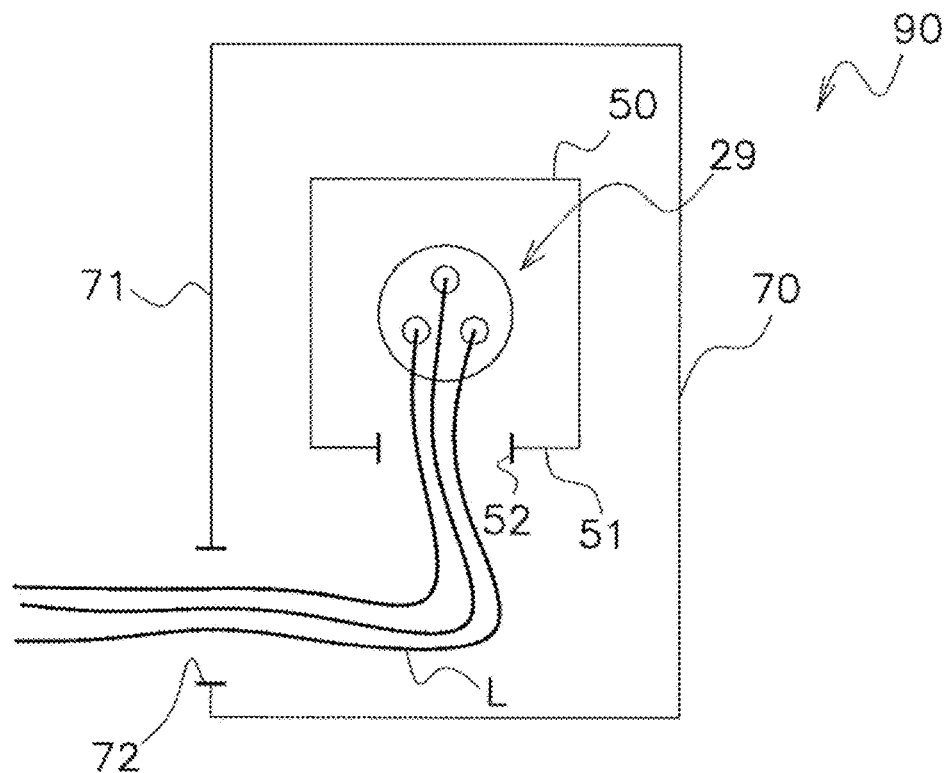
FIG. 4 is a schematic view of the terminal protection structure 90.

FIG. 4 is a schematic view of the terminal protection structure 90. The first opening 52 is formed in a first opening side surface 51 of the first cover 50. A second opening 72 is formed in a second opening side surface 71 of the second cover 70. With the second cover 70 attached to the second cover support 80, a lead wire L can pass through the second opening 72. The lead wire L extends from the terminal 29 through the first opening 52 and the second opening 72 to the outside of the terminal protection structure 90.

As illustrated in FIG. 4, the first opening side surface 51 is a lower surface of the first cover. The second opening side surface 71 is a left surface of the second cover. The first opening side surface 51 and the second opening side surface 71 do not face each other. The first opening side surface 51 and the second opening side surface 71 are not parallel to each other but, for example, perpendicular to each other.

(4) Characteristics (4-1)

The first cover 50 is covered by the second cover 70. Therefore, even if the first cover 50 is damaged and broken due to the refrigerant leaking from a broken part of the terminal 29, scattered matters such as fragments of the terminal 29 and the first cover 50 are blocked by the second cover 70. This restrains occurrence of an accident such as injury of a user.

(4-2)

The first cover 50 located close to the terminal 29 is made of resin. Therefore, the fragments of the first cover 50 do not cause undesirable conduction between the terminal pins 27. The second cover 70 disposed on the outer side is made of metal, and therefore can withstand the collision of scattered matters.

(4-3)

The differential volume CD is larger than the first volume C1. This configuration is suitable for reducing the force of the refrigerant or scattered matters spouting from a broken part of the terminal 29.

(4-4)

The leaked refrigerant collides with the metal flame-extinguishing member 75. Therefore, the flame-extinguishing member 75 restrains the ignition even if there is an ignition cause such as refrigerant, droplets of refrigeration oil, or an electric spark.

(4-5)

The flame-extinguishing member 75 is formed of a metal structure. Therefore, the flame-extinguishing member 75 absorbs heat upon contact with the refrigerant or droplets of the refrigeration oil, for example. This configuration further restrains the ignition.

(4-6)

The first opening side surface 51 and the second opening side surface 71 do not face each other. When ignition occurs at a broken part of the terminal, therefore, the flame is less likely to go out of the second cover 70.

(4-7)

The first opening side surface 51 and the second opening side surface 71 are not parallel to each other. Therefore, the flame ejected from a broken part of the terminal toward the first opening 52 is less likely to go out of the second cover 70 through the second opening 72.

(4-8)

The first cover 50 and the second cover 70 are attached independently of each other. This structure restrains scattering of the second cover 70 caused by scattering of the first cover 50.

(4-9) The second cover 70 is fastened to the second cover support 80 by the fasteners 89 such as bolts. Therefore, the second cover is firmly fixed.

(5) Modifications

Modifications of the above embodiment will be described below. For example, a plurality of modifications may be combined.

(5-1) First Modification

Figure 5:
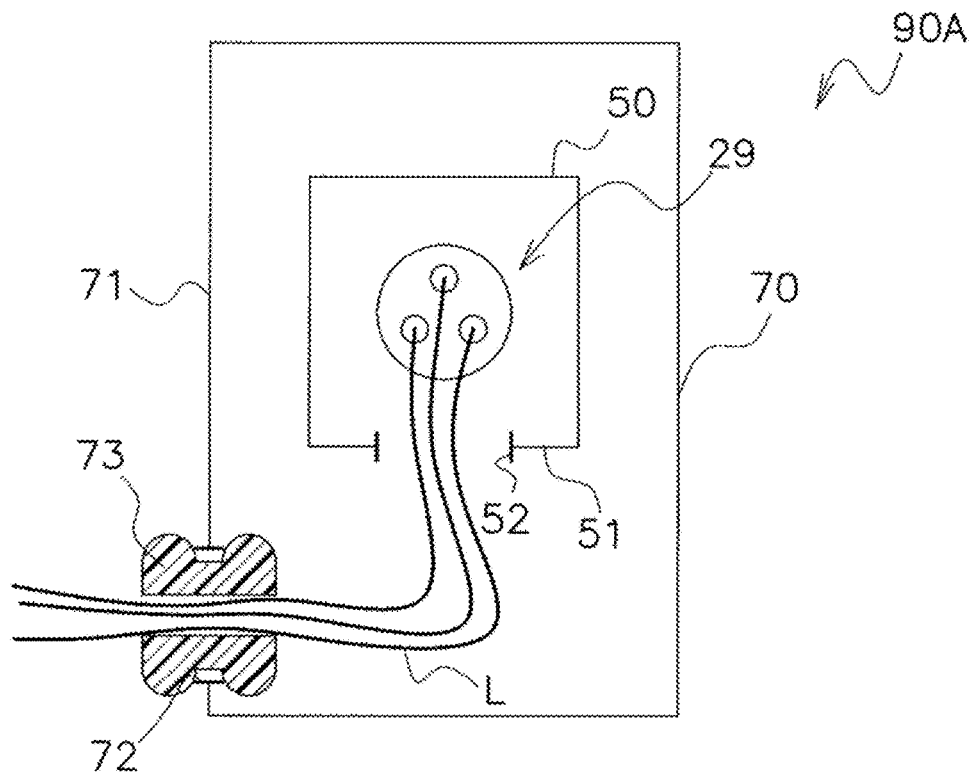
FIG. 5 is a schematic view of a terminal protection structure 90A of a compressor 10 according to a first modification of the first embodiment of the present invention.

FIG. 5 illustrates a terminal protection structure 90A according to a first modification. The terminal protection structure 90A is different from that of the above embodiment in that a seal material 73 is installed around a lead wire L at a second opening 72. Examples of the seal material 73 that can be used include a silicone foam sheet.

According to this configuration, the seal material 73 fills a gap around the lead wire L. This restrains oxygen supply to the inside of the second cover 70. Flame inside the second cover 70 is less likely to spread to the outside through the second opening 72.

(5-2) Second Modification

Figure 6:
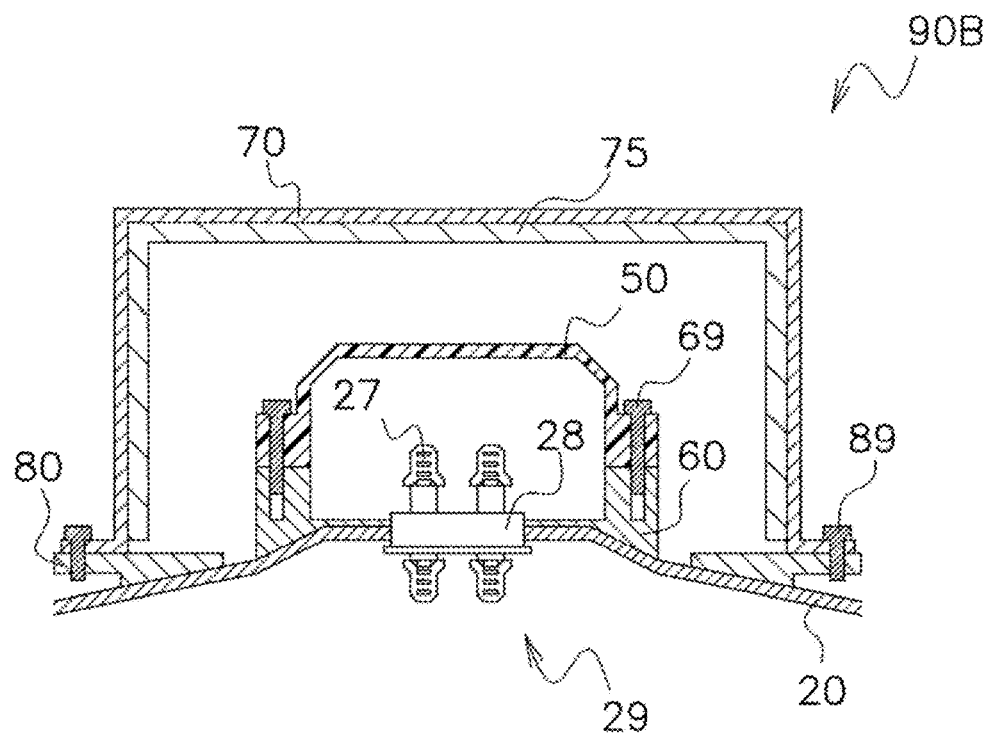
FIG. 6 is a cross-sectional view of a terminal protection structure 90B of a compressor 10 according to a second modification of the first embodiment of the present invention.

FIG. 6 illustrates a terminal protection structure 90B according to the first modification. The terminal protection structure 90B is different from that of the above embodiment in that a first cover 50 is attached to a first cover support 60 by fasteners 69, not by the engaging claw portions. The fasteners 69 are bolts or screws, for example.

According to this configuration, the first cover 50 is fastened to the first cover support 60 by the fasteners 69. Therefore, the first cover 50 is firmly fixed.

(5-3) Third Modification

Figure 7:
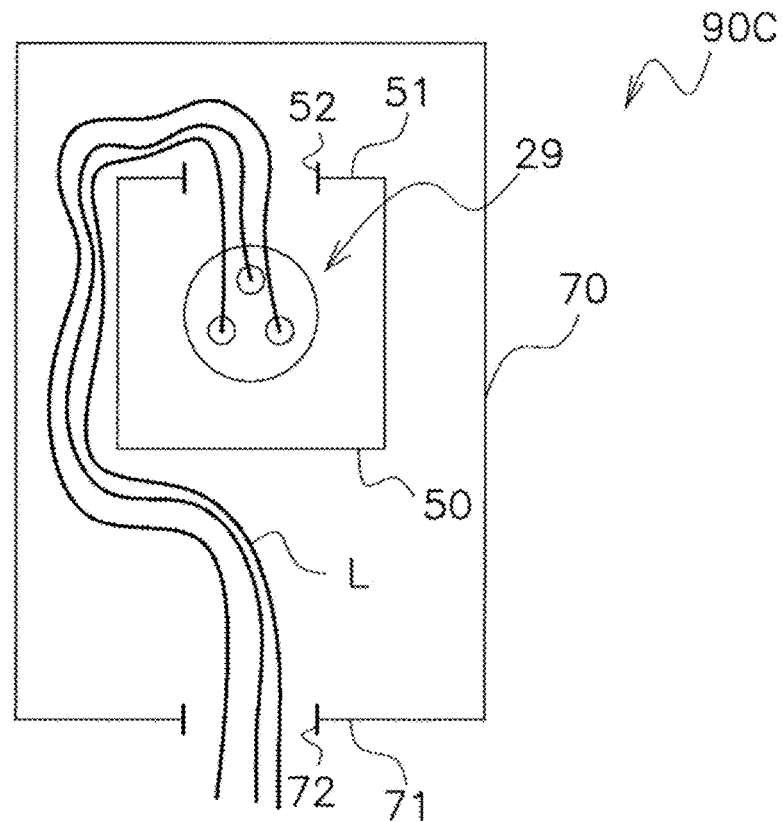
FIG. 7 is a schematic view of a terminal protection structure 90C of a compressor 10 according to a third modification of the first embodiment of the present invention.

FIG. 7 illustrates a terminal protection structure 90C according to a second modification. The terminal protection structure 90C is different from that of the above embodiment in the positional relationship between a first opening 52 and a second opening 72.

A first opening side surface 51 having the first opening 52 is an upper surface of a first cover 50. A second opening side surface 71 having the second opening 72 is a lower surface of a second cover 70.

According to this configuration, the first opening side surface 51 and the second opening side surface 71 do not face each other. When ignition occurs at a broken part of the terminal, therefore, the flame is less likely to go out of the second cover 70.

(5-4) Fourth Modification

Figure 8:
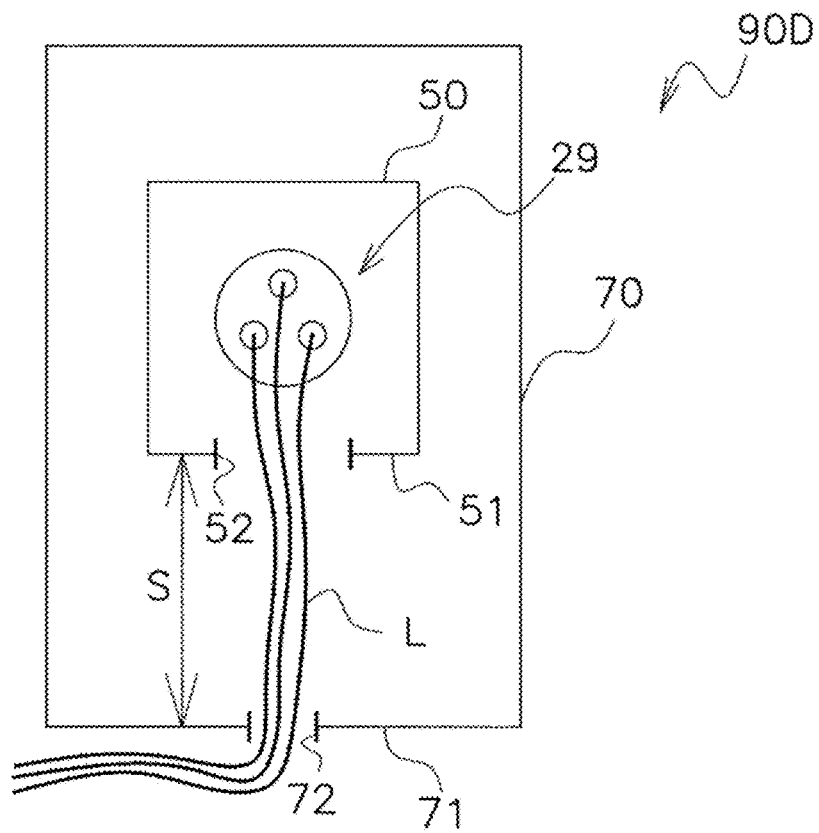
FIG. 8 is a schematic view of a terminal protection structure 90D of a compressor 10 according to a fourth modification of the first embodiment of the present invention.
Figure 9:
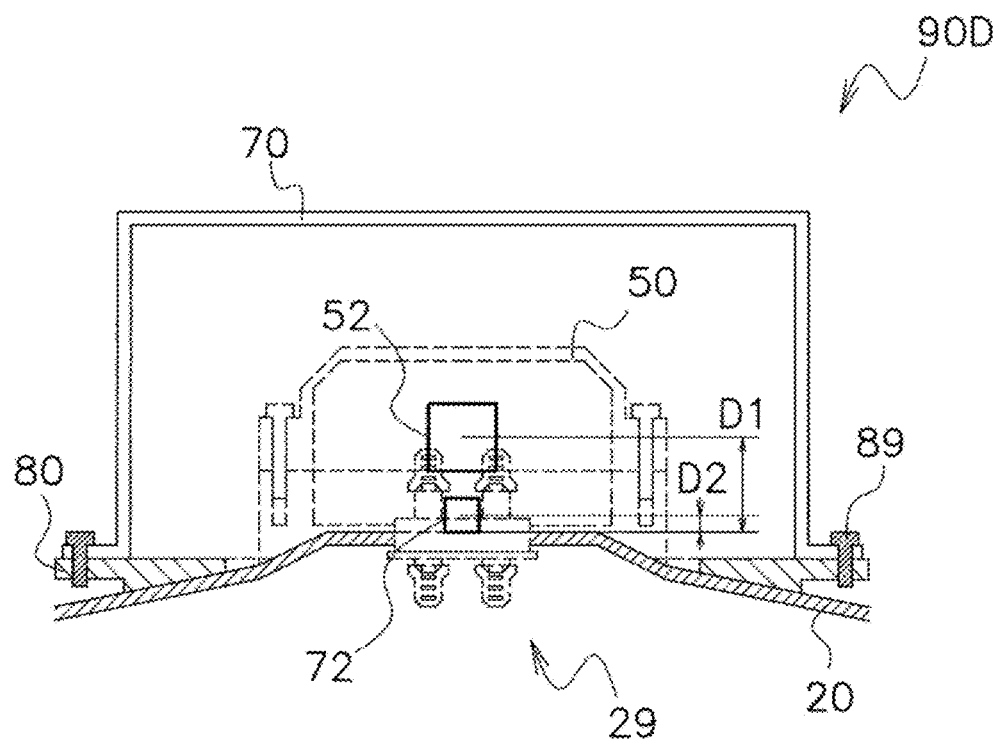
FIG. 9 is a schematic view of the terminal protection structure 90D of the compressor 10 according to the fourth modification of the first embodiment of the present invention.

FIGS. 8 and 9 illustrate a terminal protection structure 90D according to a third modification. The terminal protection structure 90D is different from that of the above embodiment in the positional relationship between a first opening 52 and a second opening 72.

As illustrated in FIG. 8, a first opening side surface 51 having the first opening 52 is a lower surface of a first cover 50. A second opening side surface 71 having the second opening 72 is a lower surface of a second cover 70. That is, the first opening side surface 51 and the second opening side surface 71 face each other.

The first opening side surface 51 and the surface of the second cover 70 facing the first opening side surface 51 (the second opening side surface 71 in this modification) are separated by a distance S. The distance S is, for example, 20 mm or more.

The relationship between the first opening 52 and the second opening 72 can be understood from FIG. 9. The area of the first opening 52 is larger than the area of the second opening 72. The center of the first opening 52 is separated from the casing 20 by a first distance D1. The center of the second opening 72 is separated from the casing 20 by a second distance D2. The first distance D1 is different from the second distance D2. The first distance D1 is larger than the second distance D2.

According to this configuration, the first opening side surface 51 and the second opening side surface 71 face each other. This makes it easy to route the lead wire L such that the lead wire L passes through both the first opening 52 and the second opening 72.

Since the area of the second opening 72 is small, flame is less likely to go out of the second opening at the time of ignition. The misalignment between the center of the first opening 52 and the center of the second opening 72 also helps to restrain the flame leaking outside.

Since the first opening side surface 51 of the first cover 50 and the surface of the second cover 70 facing the first opening side surface 51 are separated by 20 mm or more, a space is generated between the first cover 50 and the second cover 70. Therefore, the force of the flame can be weakened in that space.

(5-5) Fifth Modification

In the embodiment and modifications described above, the first opening side surface 51 is the lower or upper surface of the first cover 50 and the second opening side surface 71 is the left or lower surface of the second cover 70. Alternatively, the first opening side surface 51 may be other than the lower or upper surface of the first cover 50 and the second opening side surface 71 may be other than the left or lower surface of the second cover 70.

This configuration makes it possible to implement a design that meets various design constraints.

(5-6) Sixth Modification

In the embodiment described above, the first cover 50 is configured to fit on the inner side of the first cover support 60. Alternatively, the first cover 50 may be configured to fit on the outer side of the first cover support 60.

This configuration may facilitate the work of attaching the first cover 50 to the first cover support 60.

(5-7) Seventh Modification

In the above embodiment, the compressor 10, in which the terminal protection structure 90 of the present application is mounted, is a scroll compressor. Alternatively, the terminal protection structure 90 may be mounted in another type of compressor, such as a rotary compressor.

Second Embodiment (1) Configuration

Figure 10:
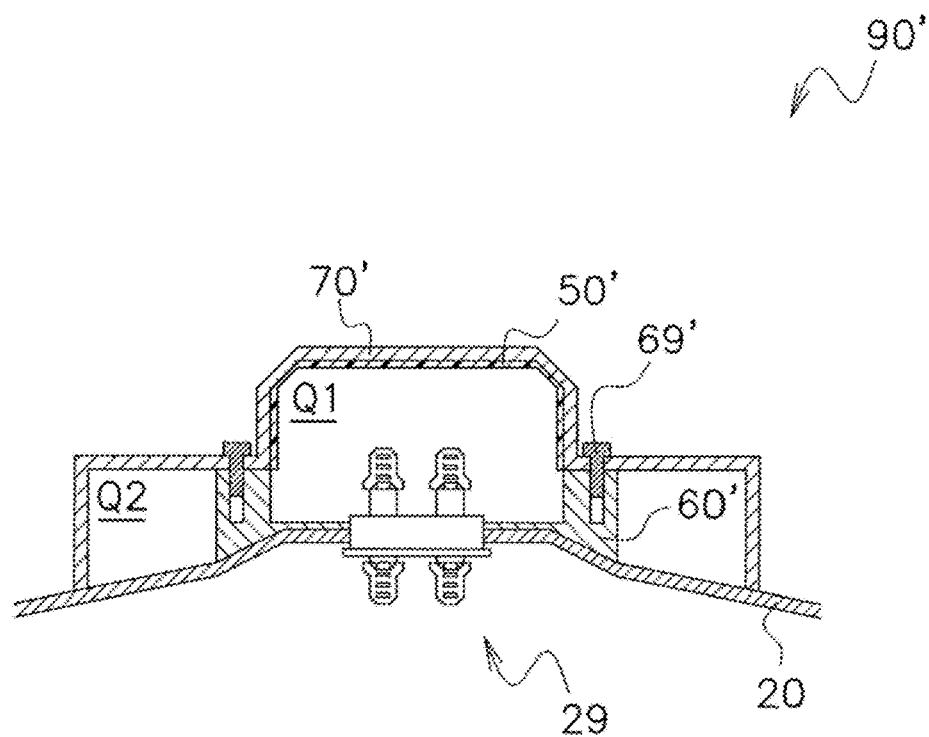
FIG. 10 is a cross-sectional view of a terminal protection structure 90' of a compressor according to a second embodiment of the present invention.
Figure 11:
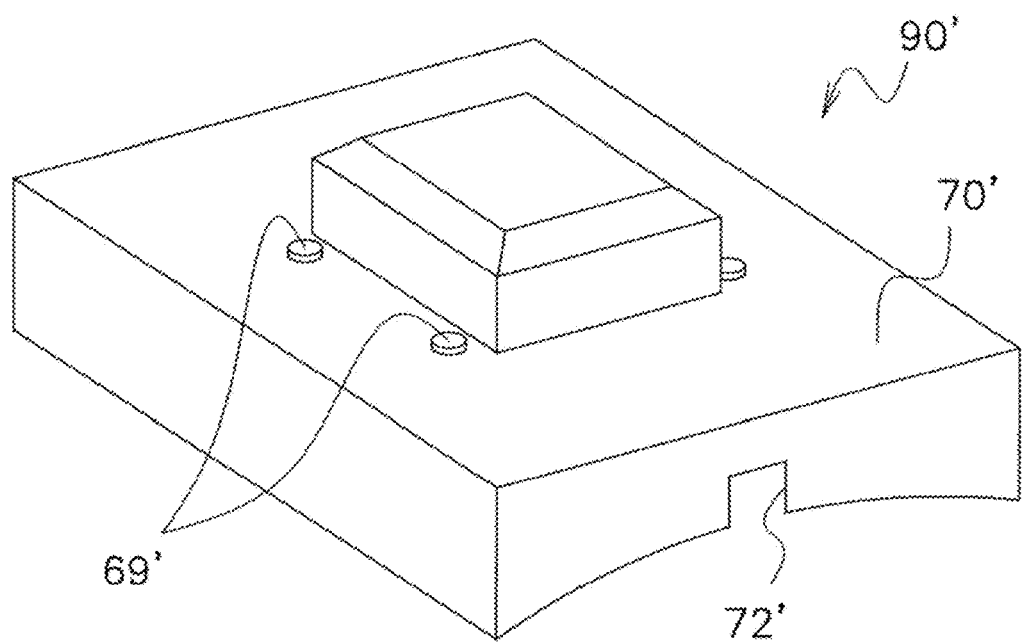
FIG. 11 is a perspective view of the terminal protection structure 90' of the compressor according to the second embodiment of the present invention.

FIGS. 10 and 11 illustrate a terminal protection structure 90' of a compressor according to a second embodiment of the present invention. In the terminal protection structure 90', a first cover 50' is fixed to a second cover 70'. Specifically, the first cover 50' is an insulating sheet. The first cover 50' is attached to the second cover 70'.

The first cover 50' and the second cover 70' are fastened to a cover support 60' by common fasteners 69'. The cover support 60' has a structure similar to that of the first cover support 60 according to the first modification of the first embodiment. That is, the cover support 60' can independently fasten, with the fasteners 69', the first cover 50 according to the first modification of the first embodiment in place of the first cover 50' and the second cover 70' according to the present embodiment.

(2) Characteristics

The first cover 50' is fixed to the second cover 70'. In addition, both the first cover 50' and the second cover 70' are fastened to the cover support 60' by the common fasteners 69'. This facilitates the attachment of the first cover 50' and the second cover 70' to a casing 20.

A first space Q1 is formed on the inner side of the cover support 60', while a second space Q2 is formed on the outer side of the cover support 60'. When flame is ejected from the first space Q1, the ejected flame is attenuated in the second space Q2. This restrains the flame going out of the second cover 70'.

(3) Modifications (3-1) First Modification

In the embodiment described above, the first cover 50 is an insulating sheet attached to the second cover 70. Alternatively, the first cover 50 may be an insulating paint applied to the second cover 70.

(3-2) Others

For example, each modification of the first embodiment may be applied to the second embodiment.

REFERENCE SIGNS LIST

10 Compressor
20 Casing
29 Terminal
50, 50' First cover
60 First cover support
60' Cover support
69, 69' Fastener
70, 70' Second cover
80 Second cover support
89 Fastener
90, 90A, 90B, 90C, 90D, 90' Terminal protection structure

CITATION LIST

Patent Literature

[Patent Document 1] JP 2007-146728 A

The invention claimed is:

1. A compressor comprising:
a casing provided with a first cover support and a second cover support, the second cover support being spaced apart from the first cover support;
a terminal protruding from the casing;
a first cover covering the terminal, the first cover being attachable to and detachable from the first cover support; and
a second cover covering the first cover, the second cover being attachable to and detachable from the second cover support independently of the first cover.

2. The compressor according to claim 1, wherein the first cover includes resin, and the second cover includes metal.

3. The compressor according to claim 1, wherein
the first cover has a first volume,
the second cover has a second volume larger than the first volume, and
a differential volume obtained by subtracting the first volume from the second volume is larger than the first volume.

4. The compressor according to claim 1, wherein a flame-extinguishing member is provided on an inner surface of the second cover.

5. The compressor according to claim 1, wherein
the first cover includes a first opening side surface in which a first opening for passing a lead wire is formed, and
the second cover includes a second opening side surface in which a second opening for passing the lead wire is formed.

6. The compressor according to claim 5, wherein the second opening is provided with a seal material that restrains flow of air passing through the second opening.

7. The compressor according to claim 5, wherein the first opening side surface and the second opening side surface face each other.

8. The compressor according to claim 5, wherein the first opening has an area larger than an area of the second opening.

9. The compressor according to claim 5, wherein the first opening side surface and a surface of the second cover facing the first opening side surface are separated by 20 mm or more.

10. The compressor according to claim 1, wherein the second cover is fastened to the second cover support by a bolt.

11. The compressor according to claim 1, wherein the first cover is fastened to the first cover support by a bolt.

12. The compressor according to claim 1, wherein the first cover is fixed to the second cover.

13. The compressor according to claim 12, wherein the first cover is a sheet attached to the second cover.

14. The compressor according to claim 12, wherein the first cover is a paint applied to the second cover.

15. The compressor according to claim 12, wherein
the casing is provided with a cover support, and
both the first cover and the second cover are fastened to the cover support by a common fastener.

16. The compressor according to claim 15, wherein the second cover is configured to be independently fastened to the cover support by a fastener.

17. The compressor according to claim 1, wherein the second cover support at least partially surrounds the first cover support.

18. The compressor according to claim 1, wherein the first cover support is a metal member welded to the casing, and the second cover support is another metal member welded to the casing, the other metal member being separate from the metal member.

19. A compressor comprising:
a casing;
a terminal protruding from the casing;
a first cover covering the terminal, the first cover including a first opening side surface in which a first opening for passing a lead wire is formed; and
a second cover covering the first cover, the second cover includes a second opening side surface in which a second opening for passing the lead wire is formed,
the first opening side surface and the second opening side surface being arranged so as not to face each other.

20. The compressor according to claim 19, wherein
the first opening side surface and the second opening side surface are not parallel to each other.

21. The compressor according to claim 19, wherein
the first opening side surface and the second opening side surface are arranged to face in directions that are non-parallel to each other or in directions that are opposite to each other.

22. A compressor comprising:
a casing;
a terminal protruding from the casing;
a first cover covering the terminal, the first cover including a first opening side surface in which a first opening for passing a lead wire is formed, the first opening has a center separated from the casing by a first distance; and
a second cover covering the first cover, the second cover includes a second opening side surface in which a second opening for passing the lead wire is formed, the second opening has a center separated from the casing by a second distance,
the first distance being different from the second distance.

23. The compressor according to claim 22, wherein
the first distance is larger than the second distance.

24. The compressor according to claim 22, wherein
the first distance is larger than the second distance.

* * * * *